United States Patent [19]

Hoorn

[11] Patent Number: 4,514,958
[45] Date of Patent: May 7, 1985

[54] AUTOMATIC X-RAY FILM CASSETTE UNLOADER AND RELOADER

[75] Inventor: Willem A. Hoorn, Amersfoort, Netherlands

[73] Assignee: E. I. Du Pont de Nemours and Company, Wilmington, Del.

[21] Appl. No.: 444,087

[22] Filed: Nov. 24, 1982

[51] Int. Cl.³ .................. B65B 5/10; B65B 43/38; B65H 1/00
[52] U.S. Cl. .................. 53/266 R; 53/382; 414/403; 414/411
[58] Field of Search .................. 53/266 C, 382, 237, 53/238; 414/403, 411

[56] References Cited

U.S. PATENT DOCUMENTS

| | | | |
|---|---|---|---|
| 3,150,263 | 9/1964 | Catlin | 53/266 C |
| 3,221,620 | 12/1965 | Sano et al. | 354/105 |
| 3,374,351 | 3/1968 | Sano et al. | 53/266 C |
| 3,675,014 | 7/1972 | Perl | 414/411 |
| 3,888,587 | 6/1975 | Perl | 414/411 |
| 3,900,405 | 8/1975 | Bartlett et al. | 414/411 X |
| 3,912,932 | 10/1975 | Matsumoto et al. | 250/468 |
| 4,049,142 | 9/1977 | Azzaroni | 414/267 |
| 4,185,200 | 1/1980 | Müller et al. | 53/266 C |
| 4,227,089 | 10/1980 | Plessers et al. | 53/266 C |
| 4,234,795 | 11/1980 | Muller | 53/266 C |
| 4,354,336 | 10/1982 | Azzaroni | 414/411 X |

Primary Examiner—Horace M. Culver

[57] ABSTRACT

An X-ray film handling system combines the unloading of the cassette, the printing of patient data, loading the cassette with a new film and processing of the film in a single instrument. The whole procedure of selecting film size, unloading the exposed film, printing the film, transporting the exposed film into the processor, reloading the cassette with a fresh film and presenting the loaded cassette back to the operator is fully automatic and requires no operator activity.

10 Claims, 13 Drawing Figures

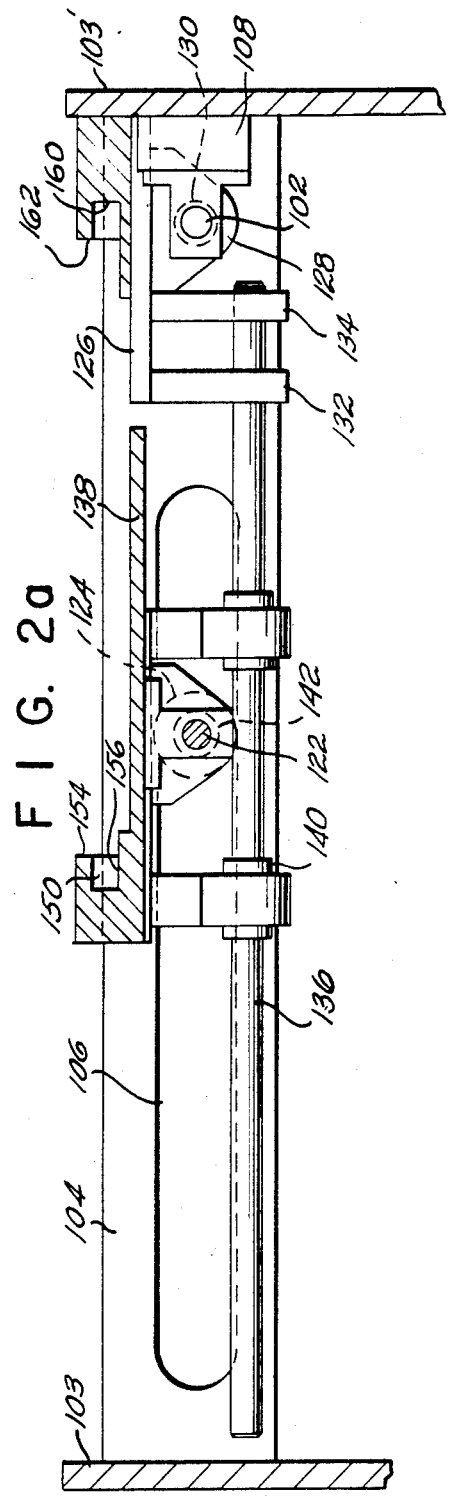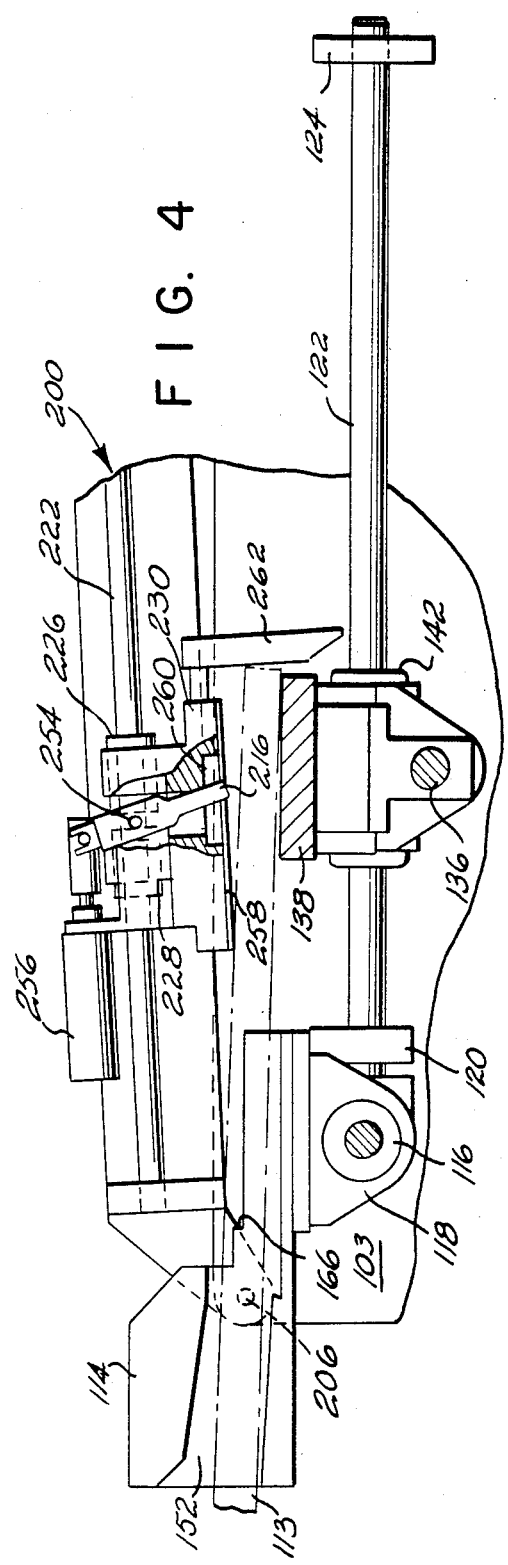

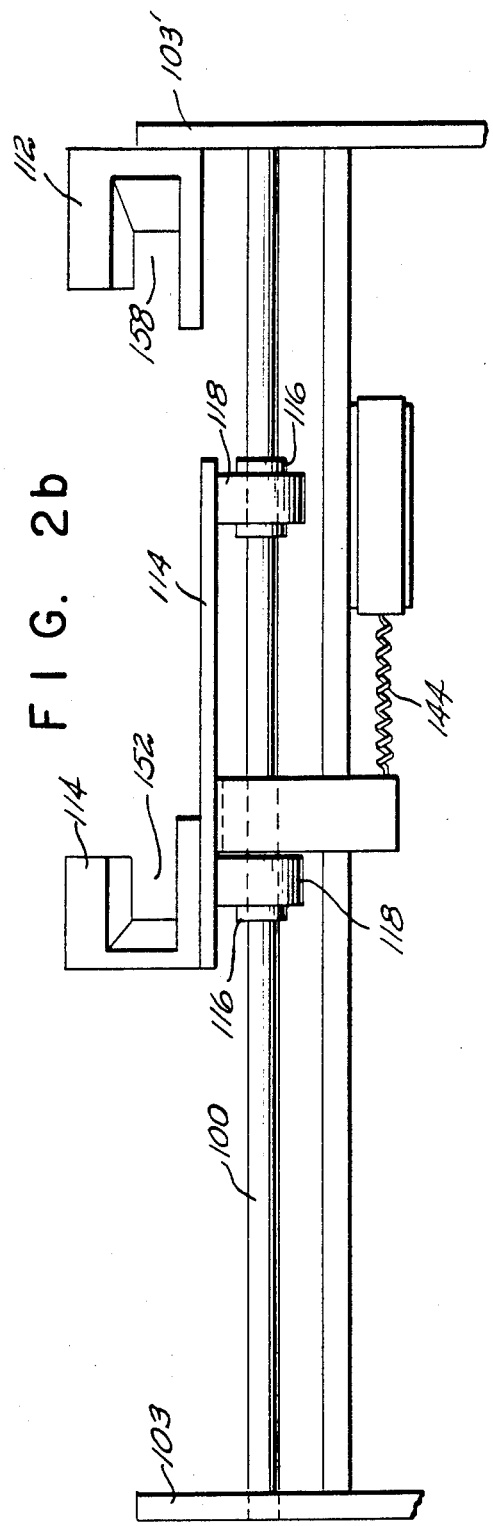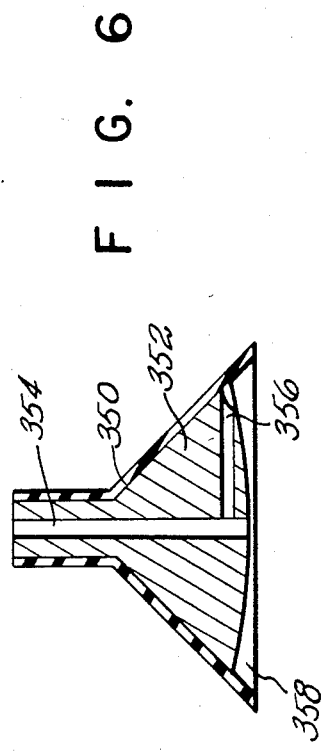

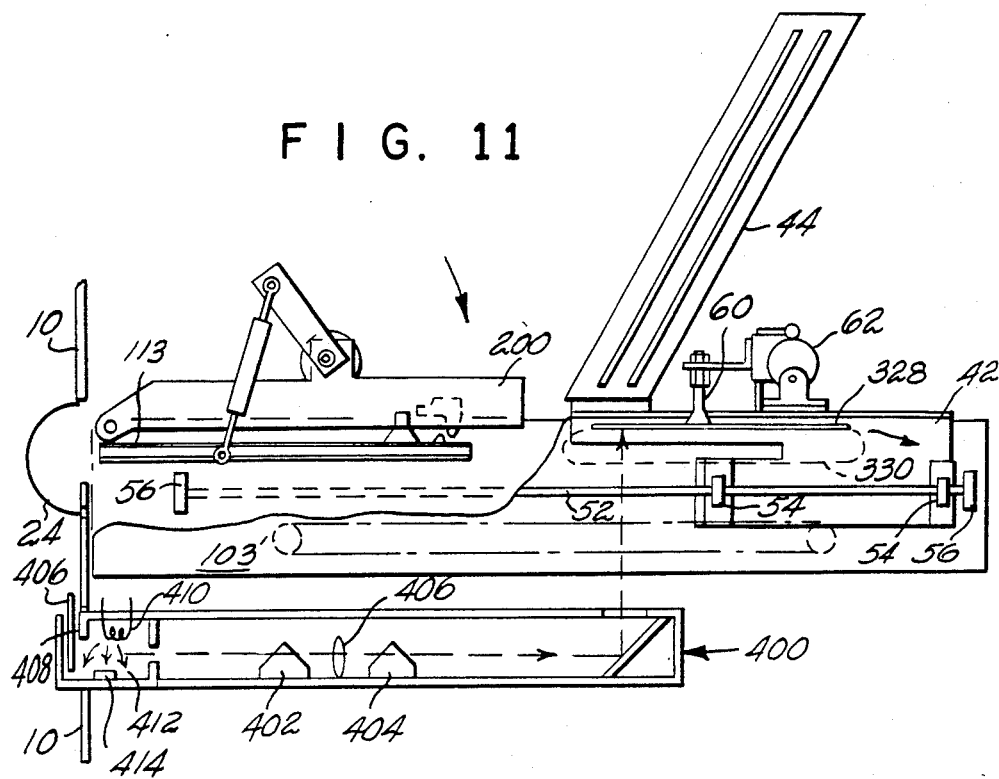
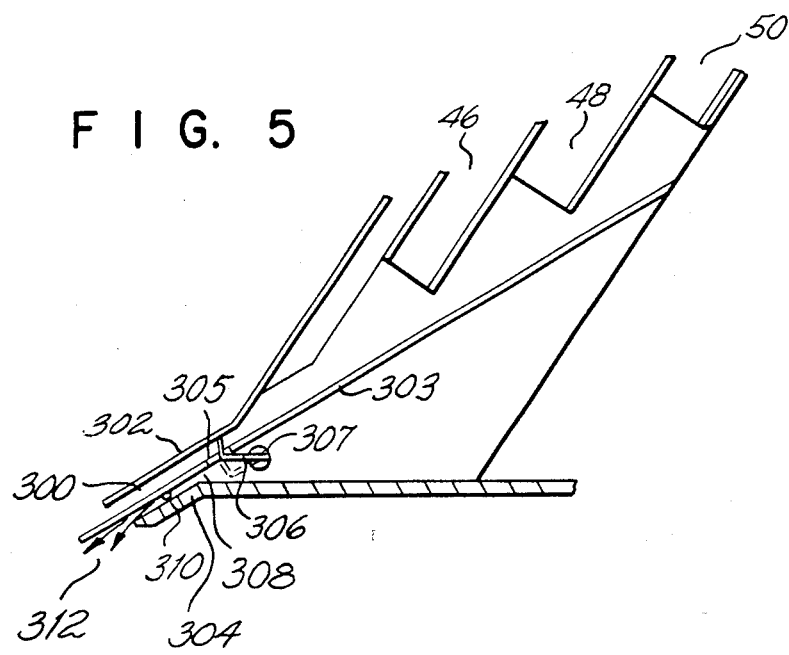

4,514,958

AUTOMATIC X-RAY FILM CASSETTE UNLOADER AND RELOADER

FIELD OF THE INVENTION

This invention concerns X-ray equipment and more particularly equipment for automatically unloading and reloading book type cassettes of various sizes with fresh X-ray sheet film, without need for a darkroom.

STATE OF THE ART

U.S. Pat. No. 3,150,263 discloses apparatus for automatically removing exposed film from a cassette, forwarding the exposed film to a cooperating processor or a temporary storage area, reloading the emptied cassette with fresh film of the same size, and then returning the reloaded cassette to a station ready for reuse or for storage in readiness for reuse.

U.S. Pat. No. 4,049,142 similarly describes an apparatus for the purpose of automatically sensing the size of an inserted cassette, unloading such cassette, and reloading with the appropriately sized film.

This type of equipment is by necessity complex since it must perform a number of functions, such as determining the size of an inserted cassette, opening the cover of the cassette, removing exposed film from the cassette and replacing it with a fresh piece of appropriately sized X-ray film selected from a supply of various sizes, closing the cassette, and finally returning the closed and reloaded cassette to the operator. In addition, all these functions must be performed in a light-tight environment. Furthermore, the nature of the X-ray film sheets is such that, during the process of loading and unloading, the sheets must be handled with extreme care to prevent any scratching, pinching, bending or undue squeezing, as any of these operations may leave marks on the film. If, following processing, these marks appear on the final image, this can render it unusable for diagnostic purposes. Finally, since X-ray film sheets comprise a silver halide emulsion coated on a polyethylene terephthalate base, usually presenting a very smooth surface, and since these films are stored as stacks of multiple film sheets in various supply magazines, there is a static electricity problem when films are removed from the stack.

It is an object of this invention to eliminate some of the above problems by providing an apparatus that minimizes film sheet handling in the process of loading and unloading a cassette. A further object is to provide an apparatus which somewhat simplifies the number of operations necessary in unloading and reloading a book-type cassette.

BRIEF STATEMENT OF THE INVENTION

These and other objectives are attained through the use of an apparatus for automatically unloading exposed film from an X-ray film cassette, and reloading with unexposed film, comprising a light-tight chamber having an entry slot for insertion and withdrawal of X-ray film cassettes, and an access gate adapted to cover and uncover said slot;

a film-holding magazine rack support mounted in said chamber;

a plurality of refillable film-holding magazines on said support, each containing a substantially vertical stack of unexposed X-ray film sheets of a predetermined size, and each further comprising an associated release mechanism, which combination functions to release on demand a single sheet of predetermined size film;

a film transport carriage mounted below the magazine rack support, and moveable between a first predetermined position directly below the release gate of a selected film-holding magazine and a second position spaced horizontally therefrom in the direction of the entry slot, said film transport carriage being equipped with (1) film-receiving slot means to receive and temporarily store substantially upright an X-ray film sheet released from the film-holding magazine, and (2) film gripping means mounted on its underside for removal of exposed film from a cassette;

a cassette-receiving and sizing rack mounted within said chamber and communicating with the outside of said chamber through said entry slot;

cassette-opening means mounted within said chamber and positioned over said cassette-receiving and sizing rack, designed to open the lid of a cassette and hold the lid in an open position, the raised lid of the opened cassette defining the aforesaid second position;

actuating means to move the film transport carriage between said first and second positions, a film receiving means in said chamber comprising inter alia a film processor equipped with a gate to permit entry of an exposed film sheet thereto;

control means to detect the presence of a cassette and to initiate the loading and unloading thereof, which control means functions to sequentially determine the cassette size, initiate the opening of the cassette lid, release an appropriately sized film sheet from a predetermined magazine into the film transport carriage and then move said transport carriage to the second position, activate the film gripping means on the underside of the film transport carriage to grip and remove the exposed film sheet from within the cassette, and simultaneously release an unexposed X-ray film sheet into the opened cassette by gravity as the carriage returns to the first position;

and means to release the exposed film sheet from the carriage into said film receiving means, close the cassette lid, and actuate indicators to indicate the completion of the unloading and reloading operation.

BRIEF DESCRIPTION OF THE DRAWINGS

The operation of the apparatus of the present invention will be hereafter described and illustrated with the aid of the following drawings:

FIG. 2a is a view of FIG. 2 taken along line 3—3.

FIG. 2b is a simplified front view of FIG. 2.

FIG. 4 is a schematic side elevation view showing the relative position of the cassette receiving rack and the cassette opening mechanism.

FIG. 5 shows in detail a cross sectional elevation of the lower portion of the film holder, including the film release gate.

FIG. 6 is a detailed cross section of the suction cup shown in the cassette unloading means of FIG. 1.

FIG. 11 shows in schematic representation the means for exposing patient identification indicia on a film sheet removed from a cassette in the apparatus of FIG. 1.

DETAILED DESCRIPTION OF THE INVENTION

Figure 1:
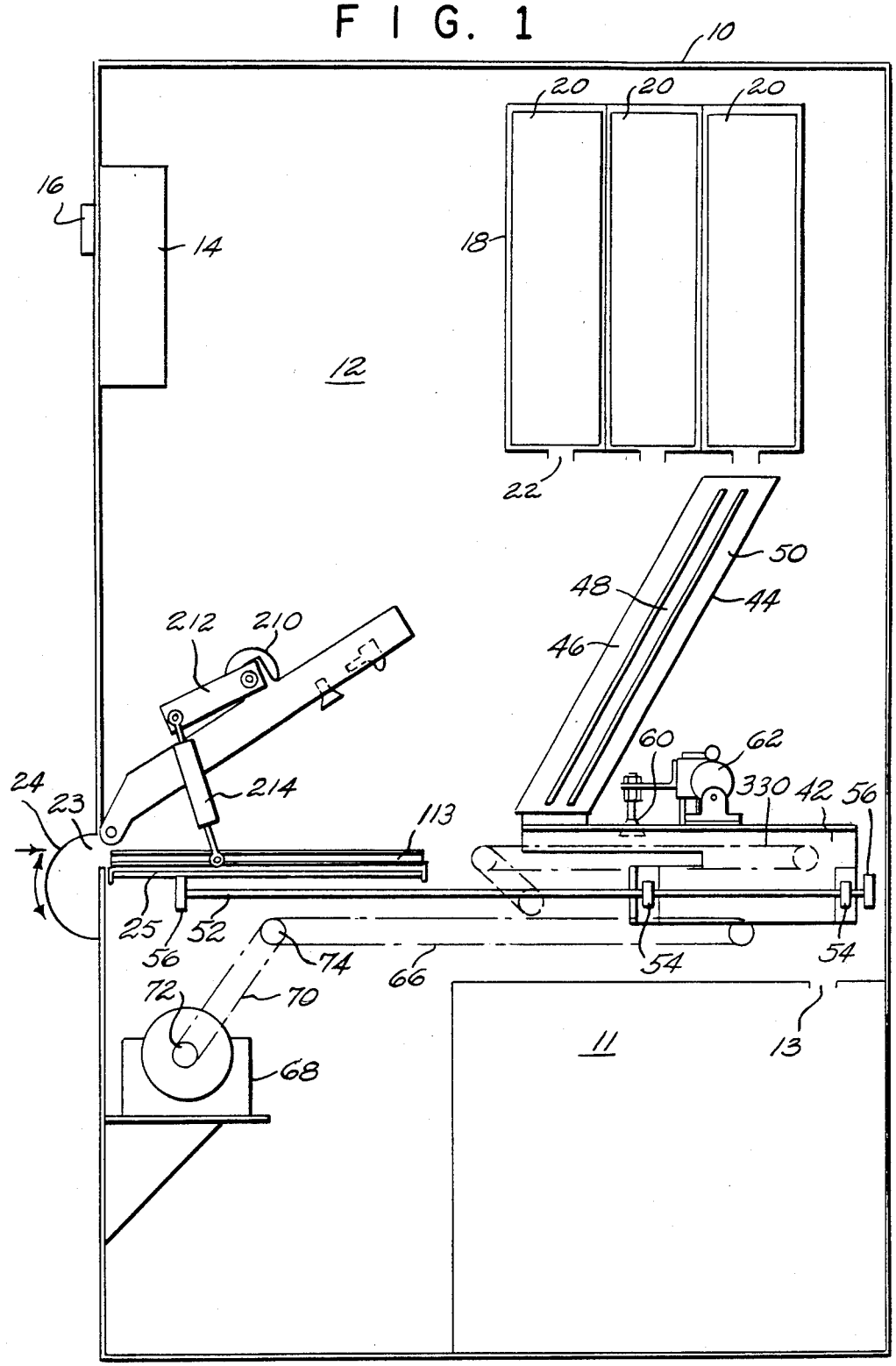
FIG. 1 is a schematic representation of the cassette loading and unloading device.

Throughout the following detailed description similar reference numerals refer to similar elements in all figures of the drawings.

Referring to FIG. 1 there is shown in schematic representation the main elements of the loading and unloading apparatus in accordance with this invention. An enclosure 10 forms a light-tight chamber 12. On one side of the enclosure there is mounted a console 14 which houses the electronic controls. This console communicates through panel 16 with the outside of the enclosure 10 providing appropriate signals to an operator indicating what functions are performed and when the task of reloading a cassette is completed. A magazine rack 18 containing a plurality of film magazines 20 is mounted near the upper portion and rear of the enclosure 10. The orientation of the magazines is such as to hold a stack of X-ray film along their edge in a generally vertical position. Not shown in FIG. 1 are appropriate means by which each of the magazines 20 may be removed from the enclosure. Removing the magazines from the enclosure is necessary to permit reloading the magazines with fresh film. This operation, of course, must be done under light-tight conditions in an appropriate dark room.

The magazine rack 18 at its lower end contains slots 22 for film delivery from the film magazines. Slots 22 cooperate with an exit slot not shown in the magazines 20. On one side of enclosure, 10 preferably the same side on which the display panel 16 is located, there is placed an entry slot 23 which is covered and uncovered by an access gate 24. When the access gate 24 is in the closed position, chamber 12 is light-tight. Immediately behind the entry slot 23, there is placed a cassette receiving and sizing rack 25.

Figure 2:
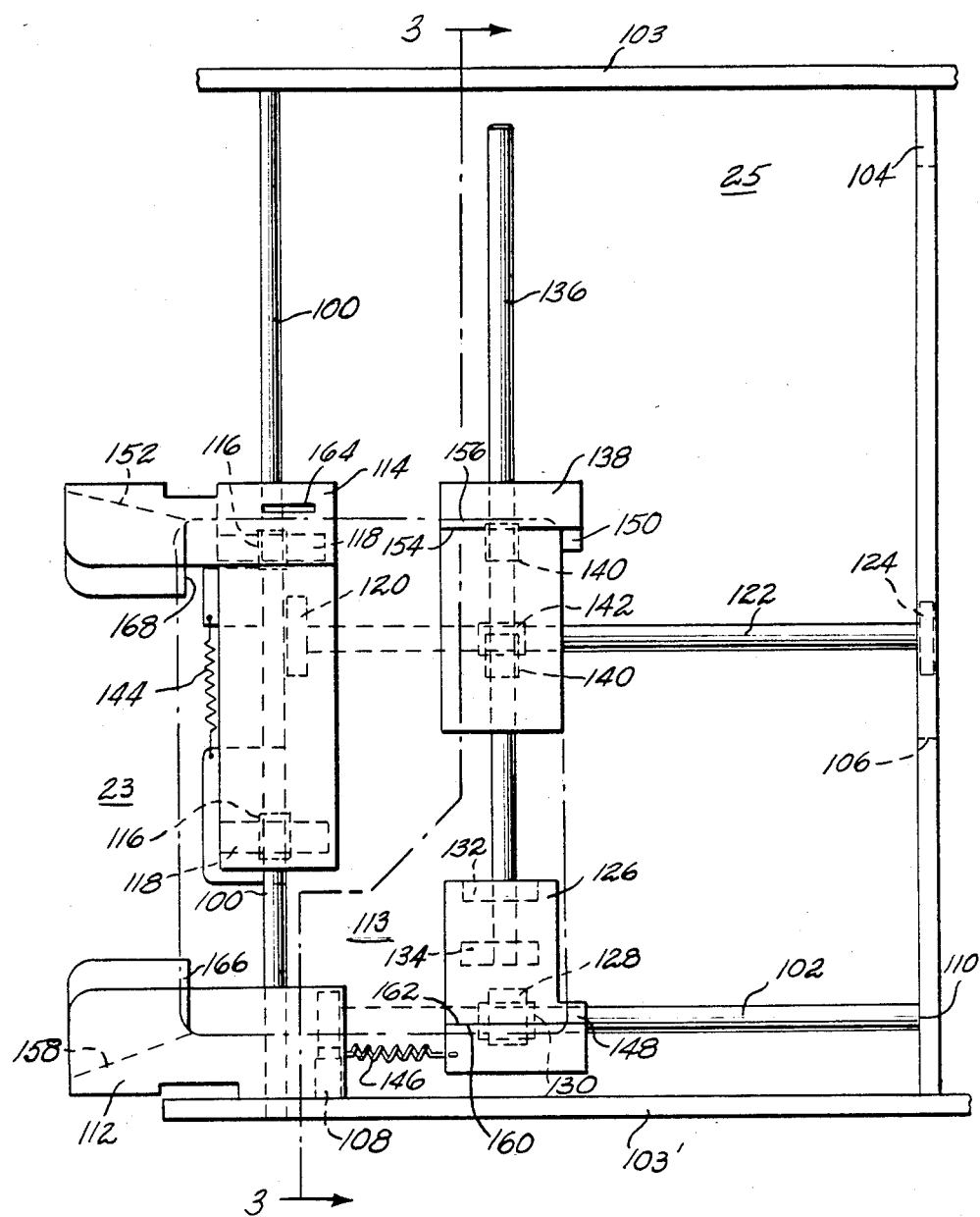
FIG. 2 is a schematic representation of a cassette receiving and sizing rack.

This rack which is shown in FIGS. 2, 2a and 2b, comprises a fixed rod 100 mounted between frames 103 and 103' supported on enclosure 10. The fixed rod 100 extends parallel to entry slot 23. Spaced from rod 100 and parallel thereto is a bar 104, also mounted between frames 103, 103'. Bar 104 includes a cut-out portion 106 (better shown in FIG. 2a). A second rod 102 extends from a point adjacent one end of slot 23 toward bar 104, substantially parallel to frame 103', supported at one end on frame 103' by a bracket 108 and at the other end 110 on bar 104.

A first combination cassette guide and support 112 is also mounted on frame 103' and bracket 108 to provide a fixed positioning point for a cassette 113 shown in phantom line placed in rack 25.

A second cassette guide and support 114 is slidably mounted on rod 100 through sleeve bearings 116 supported on brackets 118. A third rod 122 is supported on one end on a mount 120 on this support. The other end of rod 122 terminates to a wheel 124 which supports this rod while at the same time allowing rod 122 to follow the movement of cassette guide and support 114 as this latter slides along rod 100.

Referring to FIG. 2a, a third cassette support 126 is slidably mounted on rod 102 through a sleeve bearing 130 supported in bracket 128. Two additional brackets, 132 and 134, rigidly hold one end of a fourth rod 136 which extends to a point close to frame 103. On this rod 136 and slidably mounted thereon by two sleeve bearings 140 is a fourth cassette support 138. This support 138 is also slidably mounted on rod 122 through sleeve bearing 142.

Spring means 144 and 146 urge supports 114 and 126 toward support 112.

Each of the cassette supports 126 and 138 provides an abutment 148 and 150 respectively. These abutments provide a stop to a cassette 113 inserted through opening 23 so that further insertion of the cassette will move the supports along rods 102 and 122. Cassette guide and support 114 provides a cassette guide channel 152. Cassette support 138 provides a cassette gripping channel 156. The size of channel 156 is such that only the cassette frame fits therein, and the channel's upper ledge 154 does not extend past its frame so that the cassette lid may be freely opened without obstruction from the upper ledge 154 on channel 156. Similarly, cassette guide 112 provides a guide channel 158, and cassette support 126 a gripping channel 160 with a ledge 162, this ledge also not extending past a cassette frame over the cassette lid.

In operation, when a cassette is inserted through opening 23 guided through a path defined by guide channels 152 and 158 into gripping channels 156 and 160, the edges of the cassette push the spring loaded support 114, 138 and 126 sideways and inwardly until the cassette has been fully inserted. Two small ledges 166 and 168 on cassette guide and supports 112 and 114, respectively, hold a fully inserted cassette in place, while the spring tension of springs 144 and 146 maintain pressure along the cassette corners to assure that it is held firmly in place. Electronic position detecting means, not shown in the figures, detects the amount of travel of supports 126 and 114, and an electronic control system converts this displacement to a given cassette size. The size recognition circuit then determines the appropriate film size to be loaded into the cassette.

Hingedly mounted on and located over frame 103, 103', is an open frame 200 which serves to support the cassette lid opening and lifting mechanism shown in FIG. 1. A motor 210 on the frame 200 drives an arm 212 which is hingedly mounted through a damping piston 214 on frame 103' (not shown in FIG. 1). As the motor rotates arm 212, frame 200 is gradually raised and lowered over the cassette 113. A cassette unlatching mechanism shown here generally as dog 216, unlatches the cassette cover, and a suction cup 218 grips the cassette cover.

Figure 3:
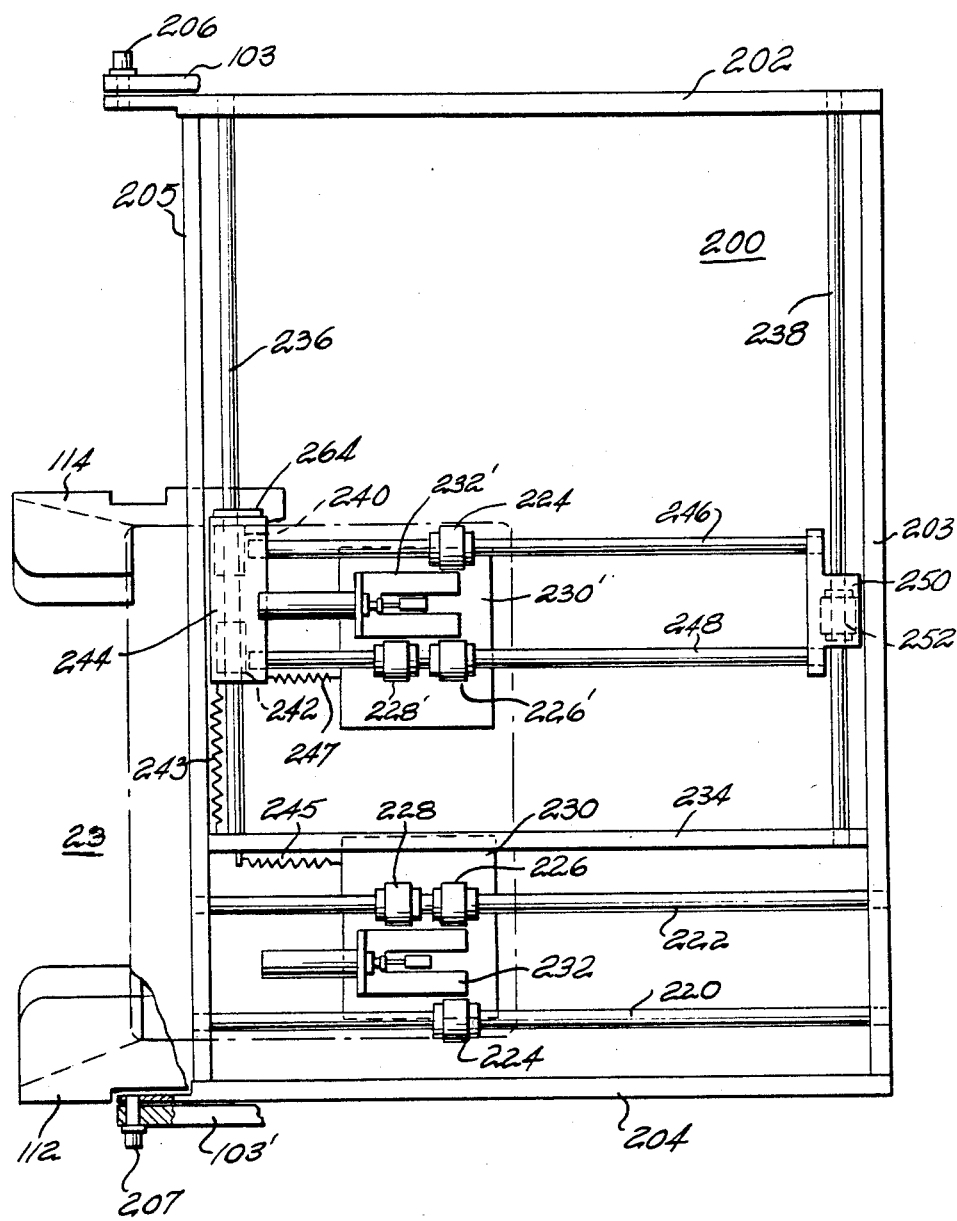
FIG. 3 is a schematic representation of the cassette lid opening mechanism viewed from the top.

The cassette opening and lifting mechanism is shown in more detail in FIGS. 3 and 4. Frame 200 is seen to be open at both top and bottom and comprises four sides 202, 203, 204 and 205. Alongside 204, extending between sides 203 and 205, and fixedly mounted thereon are 2 rods 220 and 222. On these rods, slidably supported through sleeve bearings 224, 226 and 228 is mounted an unlatching mechanism on a supporting pad 230. A bracket 234 extends between sides 203 and 205 and supports rods 236 and 238. On rod 236, slidably mounted through sleeve bearings 240 and 242 is a metal block 244 which supports two rods 246 and 248 extending parallel to rods 220 and 222. Rods 246 and 248 are supported at the other end on a second metal block 250 which is itself slidably mounted through sleeve bearing 252 on rod 238. A pad 230' similar to pad 230 supports a second cassette unlatching mechanism 232' through sleeve bearings 224', 226' and 228'.

As seen in detail in FIG. 4, the cassette unlatching mechanism 232 comprises a dog 216 hinged at about its midpoint 254 and driven through an air cylinder 256. The tip of the dog extends past the bottom surface 258 of pad 230 and is sized to engage the latch of a book-type cassette having latches on its lid surface. The bottom surface 258 of pad 230 comprises a resilient material. A cavity 260 in the pad extends through said resilient surface 258. When the frame 200 is in its down position, the pads 230 contact the cassette lid, and the resilient material 258 forms a seal around cavity 260. Through means not shown in FIG. 3 or 4, air is withdrawn from cavity 260 to provide a suction cup effect and grip the cassette lid. The combination of pad 258 and cavity 260 is shown schematically as suction cup 218 and will be referred to in this patent as such.

Also mounted on pads 230 and 230' are cams 262, one on each pad. These cams extend under the pads, to a point behind and lower than cassette supports 138 and 126. Similarly a cam 264 extends downwardly into an opening 164 on cassette guide and support 114 shown in FIG. 2. Thus, as a cassette is inserted in the receiving rack 25 pushing guide supports 114, 138 and 126, cams 264 and 262 move pads 230 and 230' following the guide supports 114, 138 and 126 to place the unlatching mechanisms over a predetermined position on the cassette lid for various cassette sizes. Springs 243, 245 and 247 urge pads 230 and 230' toward frame sides 204 and 205.

Within chamber 12 there are also mounted two transporting guide rails 52 extending substantially horizontally from the back wall of enclosure 10 to near the entry slot, slightly below the cassette holding rack and on either side of the rack.

Slideably mounted on these guide rails through slide bearings 54 is a film transport carriage 42. The upper portion of carriage 42 comprises a film holder 44 having a number of film compartments 46, 48 and 50 which are sized to hold film sheets of various size in a specific position. A film release gate 306 is located at the bottom end of the film holder. To avoid confusion, the details of this gate are not shown in FIG. 1.

Figure 10:
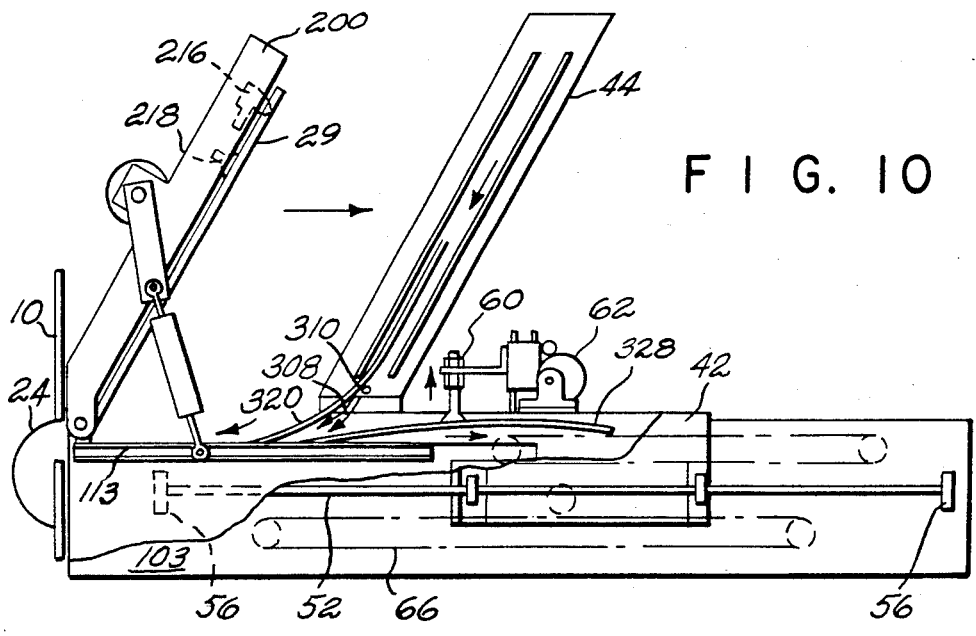

With reference to FIG. 5 the lower end of film holder 44 comprises 2 restricted channels, film channel 300 and air channel 308, (the latter is seen in FIG. 10). The channels are separated through a film slide plate 303 over which sheets of film slide out of the holder and through channel 300. The upper portion of channel 300 is formed by the forward outside wall 302 of holder 44, and the lower portion of channel 308 by the bottom wall 304 of holder 44. A film relay gate 306 extends through an opening 305 in plate 303, but when selectively actuated through a control mechanism 307 such as a solenoid, it opens (retracts) to release on demand a film sheet through channel 300. In channel 308 there is placed a tube 310 having perforations pointing toward the direction of arrows 312. Air is blown through tube 310 to form an air jet passing under a film 320 as it is released through channel 300. This air jet assures that a separation zone exists between a film passing through channel 300 into a receiving cassette and a film being removed at the same time from said cassette.

Referring to FIG. 10, mounted under the film holder 44 on the film transport carriage is a film gripping mechanism which comprises suction cups 60 driven through a motor and cam arrangement 62 which imparts up and down motion to the suction cups. In order to facilitate release of a film sheet gripped by the suction cups, an especially designed cup is used as shown in FIG. 6. A conventional, flexible suction cup skirt 350 is used in which there has been inserted a hard frustroconical plug 352 through which extends an opening 354. When suction is applied through opening 354, air is removed in the region 358 holding a film sheet firmly under the cup. When the suction is released air quickly fills region 358 through side vent 356, even when the film sheet blocks the lower portion of opening 354. Additionally, since the plug extends to almost the rim of the skirt as suction is applied, the film sheet under the cup will be deflected inwardly only by a small amount until it contacts the bottom of the plug, thus minimizing possible film damage. Means to apply suction are also included even though not shown in the drawing.

Referring to FIG. 1, end of travel blocks, shown as element 56, prevent the carriage from traveling past the transport guide rails. In the preferred embodiment, electronic detectors detect the position and length of travel of carriage 42, and a logic circuit controls its movement. A motor 68 employing a gear reduction system 72 and a timing belt 70 is used to drive the film transport carriage. This may be done through a second timing belt 66 driven through timing gears 74 and which is attached to the film transport carriage.

In a preferred embodiment a conventional X-ray film processing device 11, also seen in FIG. 1, may be placed at the lower end of enclosure 10. A gate 13 is included to permit entry of a film sheet removed from the cassette into the processor, and to avoid chemical vapors from entering into enclosure 12. In an alternate embodiment the processor 11 may be replaced by a holder for exposed sheet films for eventual processing.

The unloading and reloading operation will now be explained more fully through reference to FIGS. 1, 7, 8, 9, 10 and 11.

Figure 7:
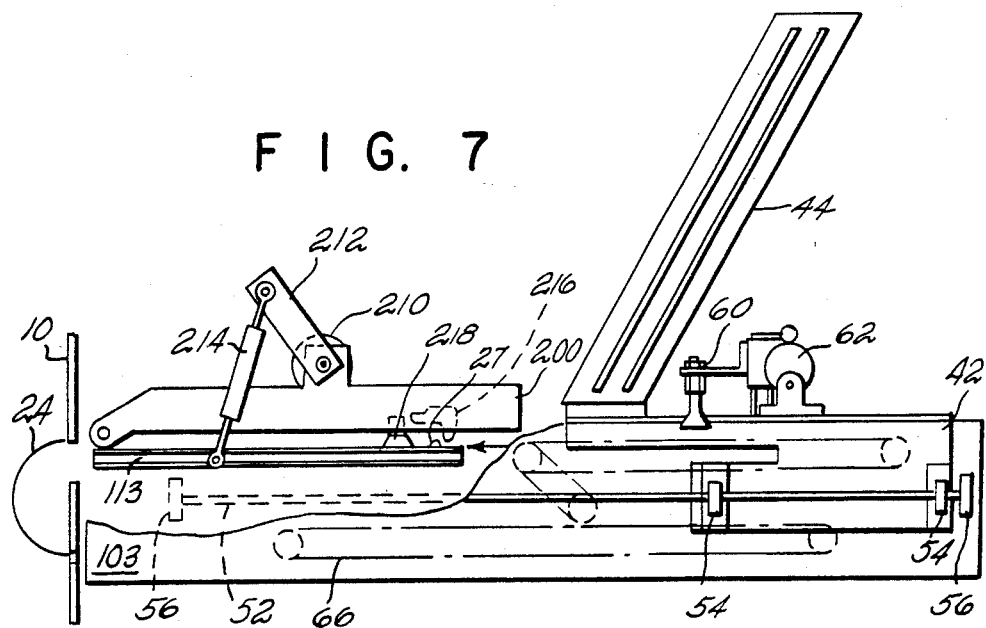
FIGS. 7, 8, 9 and 10 illustrate in schematic the process of loading and unloading a cassette inserted in the apparatus of FIG. 1.

In FIG. 7 a conventional, book type X-ray film cassette 113 is shown inserted and held on the cassette rack 25. The cassette rack has been omitted in FIGS, 7, 8, 9, 10 and 11 for clarity purposes. A book-type cassette 113 comprises a body along one side of which there is hinged the lid of the cassette. Opposite to the hinge side there is located a latching mechanism here shown by numeral 27. Once the cassette is inserted in the apparatus, and the access door closed, microswitches or, optionally, electrooptical detectors, energise the control system which selectively actuates dogs 216 mounted on a frame 200. These dogs correspond to the latches of various size cassettes. Frame 200 swings downwardly under the action of motor drive 210 until it contacts the lid of the cassette. The dogs 216, having followed cassette supports 114, 126 and 138 as previously explained, are positioned so as to engage cassette latches 27. On command from a conventional control circuit located in enclosure 14, air cylinder 256 actuates dogs 216 to release latches 27 in cassette 113 lid 29. The cassette lid is raised by suction cups 218 as shown in FIG. 8.

Figure 8:
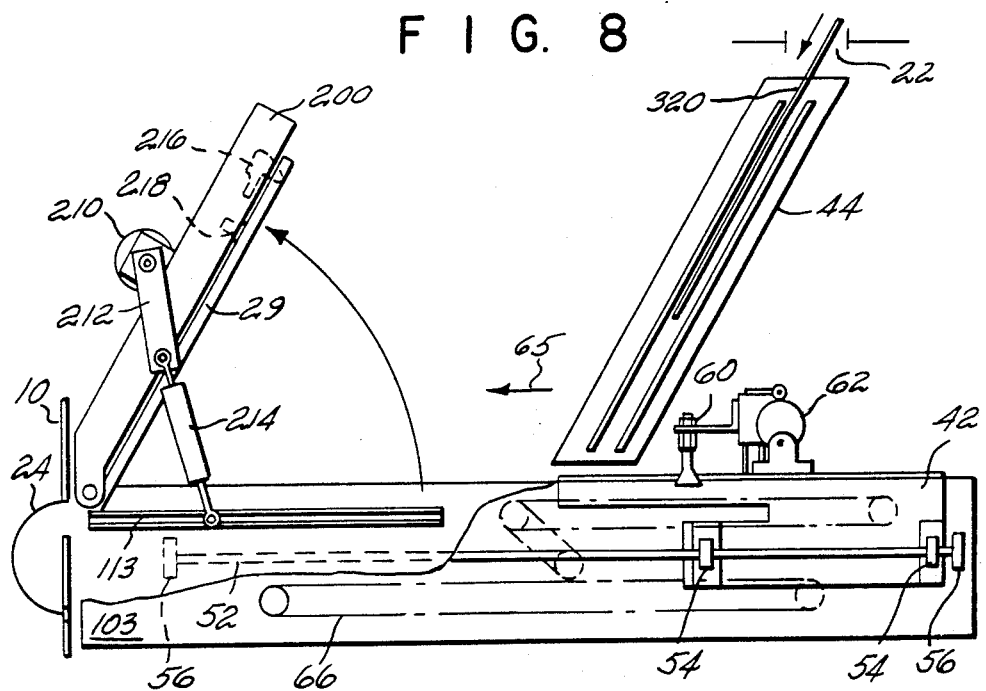

With the cassette lid in the open position as shown in FIG. 8, the control system actuates the magazine containing the size of film corresponding to the sensed cassette size. In the preferred embodiment, the magazines contain a mechanism of the type disclosed in co-pending application number Ser. No. 444,087 filed Nov. 24, 1982, which is incorporated herein by reference. However, any kind of dispensing mechanism able to dispense a single X-ray film sheet at a time may be used in this portion of the unloader and loader device.

Figure 9:
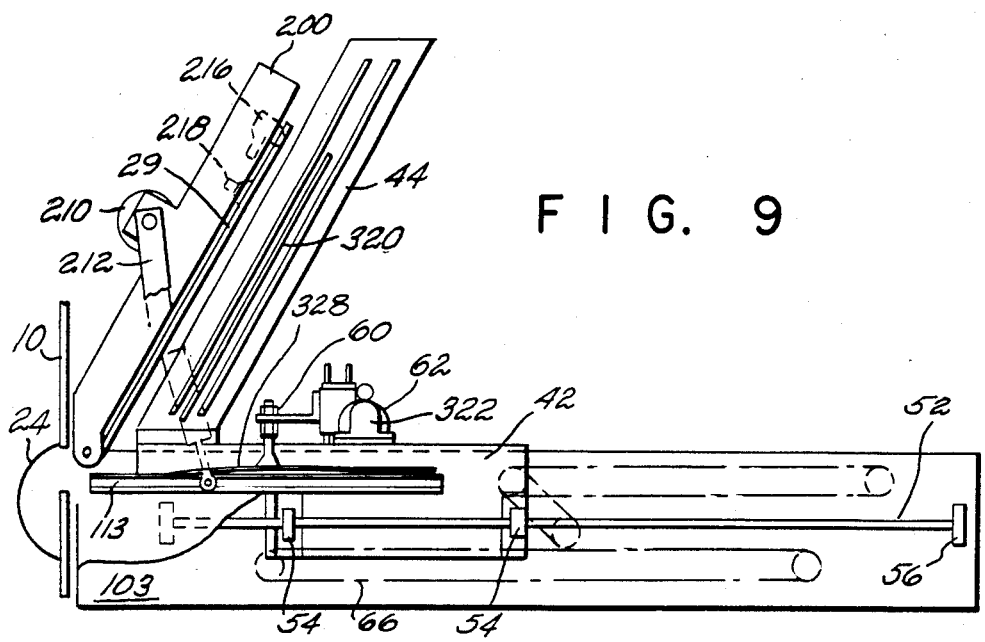

The film carriage mechanism has meanwhile moved to a position below opening 22 of the selectively actuated magazine. As the magazine releases an X-ray sheet film 320 the film drops in the appropriate compartment of the film holder portion 44 of the film transport carriage 42. At that point the gate 306 at the lower portion of carriage 42 is closed. The carriage next moves towards the opened cassette in the direction of arrow 65 as shown in FIG. 8. A position-detecting microswitch, or an electrooptical position detection system not shown, detects the point at which the transport carriage has reached all the way inside the opened cassette. Referring to FIG. 9, when the film carriage has stopped, motor 322 actuates cam wheel 62 which lowers suction cup 60 until such cup contacts an exposed film sheet 328 inside the open cassette. Vacuum suction is applied to cup 60 to grip film sheet 328. Once the film has been gripped, the film carriage reverses direction as shown in FIG. 10 and the cam wheel 62 lifts film sheet 328 out of the cassette. Simultaneously, film gate 306 is opened and film sheet 320 slides through gravity into cassette 113. A stream of air 308 is blown through tube 310 to keep the incoming fresh film sheet 320 from contacting the outgoing exposed film sheet 328 and possibly jamming the operation.

When the film carriage returns to its end position against abutment 56, or is stopped through an optical electronic position detector circuit, the suction is released from suction cup 60 allowing film 328 to fall on film transport belt drive 330 illustrated in FIG. 11. Once the film is placed on this drive, indicia identifying the patient may be projected and exposed thereon as shown in FIG. 11 through the following mechanism. A light path guide 400 including two prisms, 402 and 404, one of which is removable from the light path at will, is used to project the image of an identification card 406 inserted in the slot 408 provided at the outside of casing 10. A flash unit 410 is used to provide indirect illumination of the card by light reflected from the walls of the chamber 412. A timepiece 414 may be also used to simultaneously project date and time information on the exposed film.

Prism 402 serves to right the picture for easy reading on the exposed film, while prism 404 may be selectively inserted in the optical path to provide a reverse image useful for exposure on X-ray films bearing backside patient images, which are subsequently read reversed. This way the patient indicia appear right side up in all cases. Following exposure, the belt drive 330 guides the exposed film through gate 13.

When the film transport carriage has reached the end of its travel 56, frame 200 pivots down to close the lid of the cassette. Once this action is completed, a light on the control panel 16 indicates that the access door 24 may now be opened and the cassette retrieved. It is preferred that an interlocking mechanism not shown in these drawings be provided to prevent accidental opening of gate 24 until such time as the full unloading and reloading operation has been completed.

No details have been given of the electrical or electronic control system employed in this instance because such systems are well known in the art and are not the essence of this invention. The control operations involve the simple sequential and/or simultaneous actuation of various electrical devices. In the preferred embodiment, a microprocessor is employed, programmed to sequentially step the machine through its various steps in response to signals received from electrooptical detectors functionally connected to various moving parts. The mechanics of the apparatus work extremely fast; depending on the cassette size, a new cassette may be inserted every 10-14 seconds, allowing a high throughput of up to 300 cassettes per hour.

Those skilled in the art having the benefit of the teachings hereinabove set forth may effect numerous modifications thereto within the scope of this invention.

I claim:

1. An apparatus for automatically unloading exposed film from an X-ray film cassette and reloading with unexposed film, comprising
    a light-tight chamber having an entry slot for insertion and withdrawal of X-ray film cassettes, and an access gate adapted to cover and uncover said slot;
    a film-holding magazine rack support mounted in said chamber;
    a plurality of refillable film-holding magazines positioned on said support, each containing a substantially vertical stack of unexposed X-ray film sheets of a predetermined size, and each further comprising an associated release mechanism, which combination functions to release on demand a single sheet of predetermined size film;
    a film transport carriage mounted below the magazine rack support and moveable between a first predetermined position below said rack support and a second position spaced horizontally therefrom in the direction of the entry slot, said film transport carriage being equipped with (1) a first film-receiving means to receive and temporarily store an X-ray film sheet released from the film-holding magazine, and (2) film gripping means for removal of exposed film from a cassette,
    a cassette-receiving and sizing rack mounted within said chamber, and communicating with the outside of said chamber through said entry slot;
    cassette-opening means mounted within said chamber and positioned over said cassette-receiving and sizing rack, designed to open the lid of a cassette and hold it in an open position, the raised lid of the opened cassette defining the aforesaid second position;
    actuating means to move the film transport carriage between said first and second positions,
    a second film receiving means in said chamber,
    and means to release the exposed film sheet from the film transport carriage into said second film receiving means.

2. The apparatus of claim 1 wherein the release mechanism for each film holding magazine comprises two restricted channels at the base of the film holders, one channel serving as a film channel and the other as an air channel; a film slide plate separating said channels, over which sheets of film may slide out of the holder and into the film channel; a selectively retractable film gate in said film channel which, when retracted, releases a film sheet through the film channel; and means for forcing a stream of air through said air channel and in the direction of the film sheet thus released, whereby an air jet is formed under said film sheet so as to define a separation zone between the film being released and an exposed film sheet being removed from the cassette.

3. The apparatus of claim 1 further comprising a set of guide rails supporting the film transport carriage.

4. The apparatus of claim 1 wherein the film gripping means on the underside of the film transport carriage is a suction cup.

5. The apparatus of claim 1 wherein the first predetermined position for said film transport carriage is below the release gate of a preselected film-holding magazine.

6. The apparatus of claim 1 wherein the film gripping means is mounted on the underside of said film transport carriage.

7. The apparatus of claim 1 wherein said second film receiving means comprises a film processor in said chamber equipped with a gate to permit entry of an exposed film sheet.

8. The apparatus of claim 1 wherein the cassette-receiving and sizing rack comprises two fixed rails placed at 90° to each other, one parallel to the entry slot and the other perpendicular thereto, plus two more rails which complete the main frame of the rack and are moveable, and a cassette abutment at each junction of two rails, which function to provide a resting place on which an X-ray cassette may be placed and gripped for further processing.

9. The apparatus of claim 1 wherein means to release the exposed film sheet from the film transport carriage comprises inter alia, means to close the cassette lid, and means to actuate indicators to indicate the completion of the unloading and reloading operation.

10. The apparatus of claim 1 wherein the chamber is equipped with
control means which sequentially detects the insertion of a cassette into the chamber, determines the cassette size, initiates the opening of the cassette lid, releases an appropriately sized film sheet from a predetermined magazine into the film transport carriage and then moves said transport carriage to the second position, activates the film gripping means on the underside of the film transport carriage to grip and remove the exposed film sheet from within the cassette, and simultaneously releases an unexposed X-ray film sheet into the opened cassette by gravity as the carriage returns to the first position.

* * * * *